No. 725,585. PATENTED APR. 14, 1903.
F. W. POLLOCK.
BADGE.
APPLICATION FILED JUNE 19, 1902.
NO MODEL.
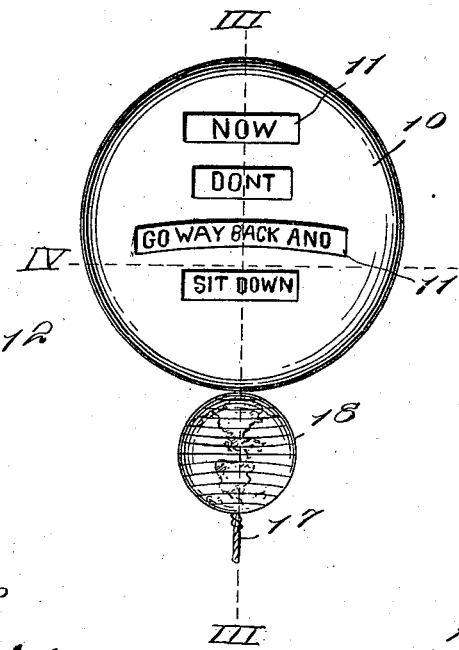
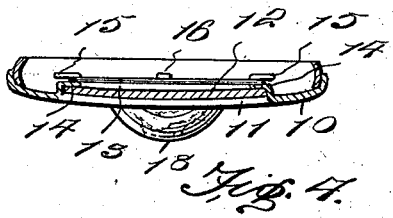
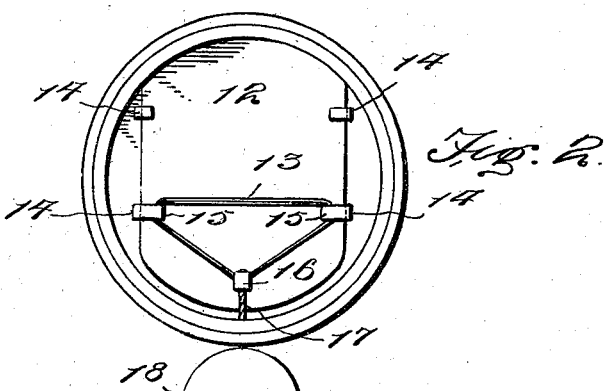
Witnesses
E. F. Stewart
C. N. Woodward
F. W. Pollock Inventor
By C. A. Snow & Co.
Attorneys

UNITED STATES PATENT OFFICE.

FREDERICK W. POLLOCK, OF KIRKVILLE, MISSOURI.

BADGE.

SPECIFICATION forming part of Letters Patent No. 725,585, dated April 14, 1903.

Application filed June 19, 1902. Serial No. 112,379. (No model.)

*To all whom it may concern:*

Be it known that I, FREDERICK W. POLLOCK, a citizen of the United States, residing at Kirkville, in the county of Adair and State of Missouri, have invented a new and useful Badge, of which the following is a specification.

This invention relates to badges adapted to be worn on garments, more especially upon the lapels of gentlemen's coats, but which may also be worn on other garments, and has for its object to provide a badge having certain printed matter or pictures or combinations of printed matter and pictures arranged in two or more independent series and adapted to be alternately exposed to view through openings in the face of the badge.

The invention consists in the novel construction and mechanism whereby the desired results are accomplished, as hereinafter shown and described, and specified in the claims.

In the drawings illustrative of the invention, Figure 1 is a front view of the badge. Fig. 2 is a rear view of the same. Fig. 3 is a vertical section on the line III III of Fig. 1. Fig. 4 is a transverse section on the line IV IV of Fig. 1. Fig. 5 is a front view of the movable plate detached.

The badge may be of any desired size or material and of any desired configuration; but for the purpose of illustration it is shown circular in form.

The framework of the badge consists of a face-plate 10, having a series of spaced apertures 11 formed through its front, as shown. These apertures will be varied to adapt them to the matter which it is proposed to use in the badge; but for the purpose of illustration they are shown in the form of transverse slots spaced apart and of varying lengths.

Movably disposed within the badge and immediately in the rear of the openings 11 is a plate 12 of a size sufficient to completely cover the openings and shut off the view through them. This plate 12 will be supported yieldably in either its upward or downward position, and for the purpose of illustration this yieldable means is shown consisting of a spring 13, preferably of rubber. The plate 12 is shown supported by guides 14, attached to the rear inner side of the portion 10 and extending over the edges of the plate 12, as shown, the lowermost opposite pair of the guides extended into hooks 15, which afford supports for the endless rubber band-spring 13, the bight of the band-spring being engaged to a hook 16 on the lower end of the plate 12. By this means it will be readily understood the force of the spring 13 will be exerted to maintain the plate 12 normally and yieldably in its upward position. By this means the guide 14, having the hooks 15 thereon, perform the double function of guides for the plate 12 and also as hooks for the spring.

Attached to the plate 12, preferably to the spring-support 16, is a draw cord or wire 17, passing through an aperture in the casing 10 and extending below the casing and affording means for operating the plate. The draw-cord 17 below the frame 10 will be provided with an enlargement, preferably in the form of a hemisphere 18, the latter provided on its globular face with representations of the surface of the earth, preferably the Western Hemisphere, and with its flat side preferably provided with some suitable configuration, as a human head, the member 18 affording a finger-grip to assist in operating the plate 12.

Any suitable matter may be arranged upon the plate, to be used in any desired manner, and the device may be put to a great many different uses. For instance, the part of the plate exposed to view through the apertures 11 might be provided with a question and the answer to the question placed upon the plate in a position to be exposed when the plate is moved downward, so that while the plate is in its elevated position the question will appear to view and the answer appear when the plate is drawn downward. Then, again, the plate 12 might be occupied with a picture representing some object or idea, which would appear to view through the apertures when the plate is in its elevated position, and another picture or series of pictures placed upon the plate in position to be concealed when the plate is in its elevated position and appear only when the plate is operated, the second set of pictures being the reverse of or explanatory of the first set of pictures. It will be readily understood, therefore, that the device may be employed in a great variety of ways and the latter be modified and changed to an almost unlimited extent.

While the hemispherical or semiglobular form of the member 18 is preferable, this part may be formed in any other suitable shape.

The face of the badge may be ornamented in any desired manner and emblems and other adjuncts and configurations employed in connection with it to suit the taste or to correspond to the object for which the device is to be employed.

Having thus described my invention, what I claim is—

1. A badge comprising a frame having one or more apertures in its face, a plate disposed slidably in said frame and covering said apertures, spaced guides to said plate extending from the interior of said frame and formed into hooks, a projection from the rear of said plate, a spring engaging said hook-guides and said projection and adapted to exert its force to maintain said plate yieldably at one end of its movement, means operative outside said frame for actuating said plate, characters or representations of objects upon said plate which appear to view opposite said apertures only when said plate is at one end of its movement, and independent characters or representations of objects which will appear to view through said apertures only when said plate is at the other end of its movement, substantially as described.

2. A badge comprising a frame having one or more apertures in its face, a plate disposed slidably in said frame and covering said apertures, spaced guides to said plate extending from the interior of said frame and formed into hooks, a projection from the rear of said plate, a spring engaging said hook-guides and said projection and adapted to exert its force to maintain said plate yieldably at one end of its movement, a draw-cord connected to said plate and leading through said frame and provided with a knob outside the frame, substantially as described.

In testimony that I claim the foregoing as my own I have hereto affixed my signature in the presence of two witnesses.

FREDERICK W. POLLOCK.

Witnesses:
B. F. HEINY,
ROY OMER.